July 11, 1950 G. O. YOUNG 2,514,824
THREAD LET-OFF MECHANISM
Filed Sept. 2, 1947 2 Sheets-Sheet 2
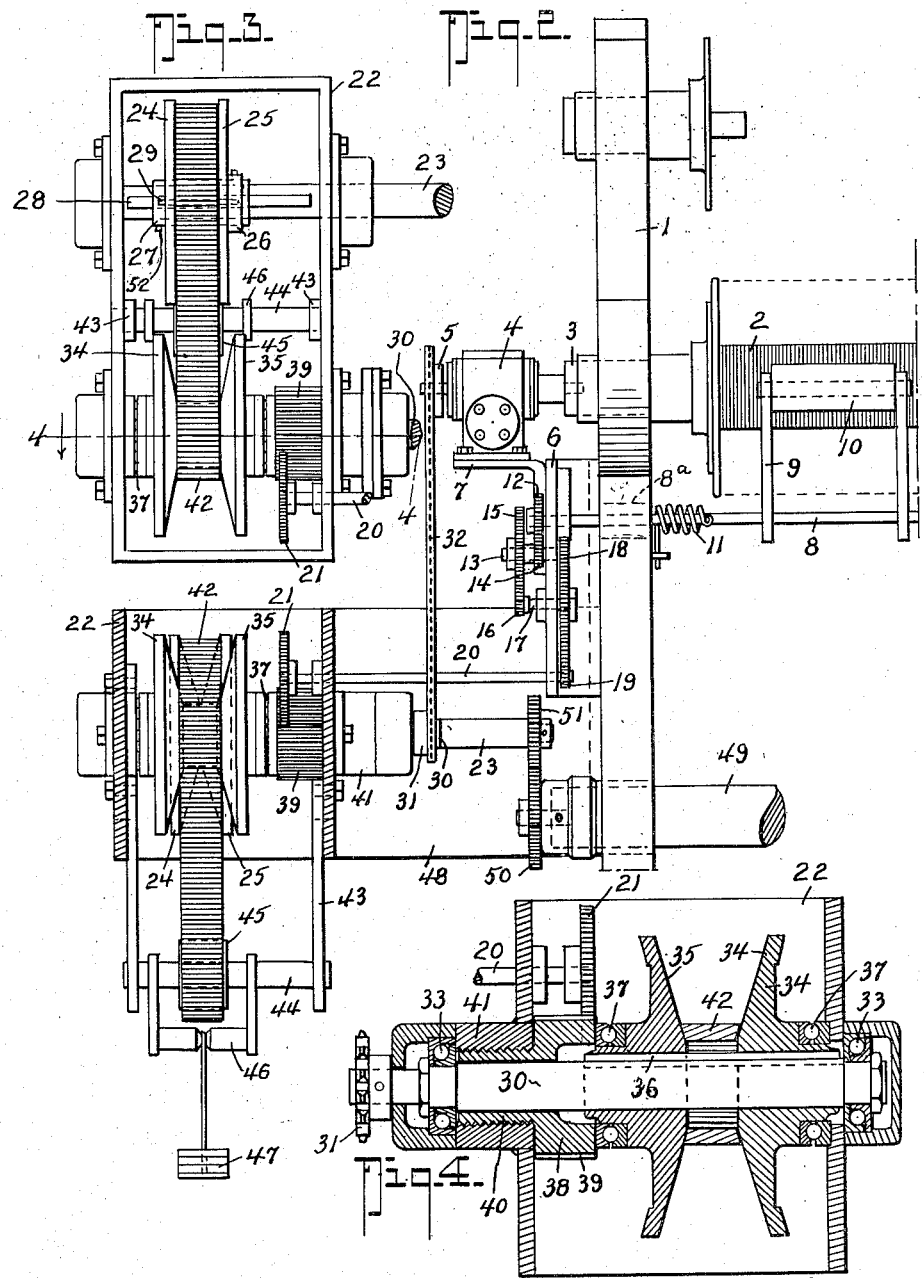
Inventor,
George O. Young,
By Albert E. Dieterich,
Attorney.

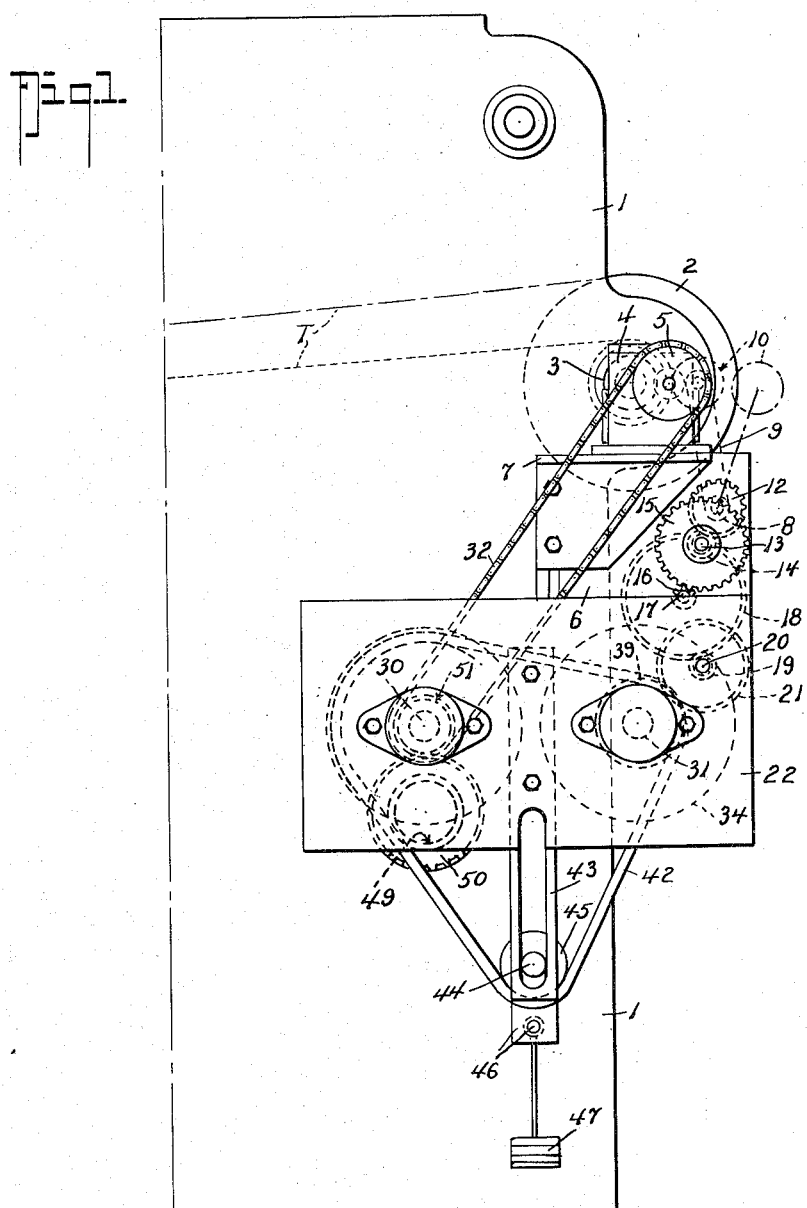

Patented July 11, 1950

2,514,824

UNITED STATES PATENT OFFICE 2,514,824

THREAD LETOFF MECHANISM

George O. Young, Robesonia, Pa., assignor to Vanity Fair Mills, Inc., Reading, Pa., a corporation of Pennsylvania Application September 2, 1947, Serial No. 771,619

2 Claims. (Cl. 66—86)

My invention relates to knitting machines, and particularly to means for feeding thread from the beam or beams to the needles.

It has been found desirable to let off thread from the beam at a constant linear speed so that only the required amount of thread used in a knitting cycle is fed off the beam without constantly stopping and starting the beam with each needle reciprocation.

Means have heretofore been devised for turning the beam continuously during the knitting process, and I do not broadly claim such mechanism, my present invention having for its object to improve the known means by rendering the same more accurate and efficient in its operation. To this end my invention resides in the novel details of construction, combinations, and arrangements of parts, all of which will first be described in detail and then be specifically pointed out in the appended claims, reference being had to the accompanying drawings, in which:

Fig. 1 is a side elevation of a portion of a knitting machine embodying my invention.

Fig. 2 is an elevation of the same, parts being shown in section, and looking from right to left in Fig. 1.

Fig. 3 is a top plan view of a special positive infinitely variable speed unit, constituting a portion of my invention.

Fig. 4 is an enlarged cross section of the same on the line 4—4 of Fig. 3.

In the drawings, in which like numerals of reference indicate like parts in all the figures, 1 represents a portion of the frame of a knitting machine, 2 one of the beams (my invention is shown applied to one beam only, although it will be duplicated when a second or third beam is used), 3 the beam shaft, 4 a speed reducer of any approved construction, and 5 the speed-reducer shaft sprocket. The speed reducer 4 is mounted on a suitable bracket 7 adjustably secured to a bracket 6 which, in turn, is mounted on the frame 1.

A rock shaft 8 is mounted in suitable bearings 8ª in the end frames 1, and passes through a bearing hole in the bracket 6. To the projecting end of shaft 8 is secured a gear 12 which meshes with a pinion 14 of a two-part gear, the larger gear part 15 meshing with a pinion 16 on a short shaft 17 journalled in the bracket 6 and carrying a large gear 18 that meshes with a pinion 19 on a shaft 20. The two-part gear 14, 15 is journalled on a stub shaft 13 carried by bracket 6.

Secured to the shaft 8 is a pair of arms 9 carrying a beam-contacting roller 10, a suitable spring 11 maintaining the roller in contact with the beam 2, as best shown in Fig. 2.

The shaft 20 is journalled in bracket 6 and in the housing of an infinitely variable speed device 22, within which device a gear 21 is secured to shaft 20.

The infinitely variable speed device 22 includes an input shaft 23 journalled in suitable bearings in the housing of the device and carrying two half-pulleys 24 and 25. The pulley parts 24 and 25 are keyed at 28 to turn with the shaft 23. The pulley part 24 is fixed to the shaft, while the pulley part 25 is adjustably held on the shaft, the purpose of which will presently appear. The pulley parts 24 and 25 are keyed to a bushing 27 as at 29, along which the part 25 may be adjustably held by a collar 26, the bushing being keyed at 28 to the shaft and locked thereon by a suitable pin 52 (see Fig. 3).

The out-put shaft 30 is journalled in suitable antifriction bearings 33 and carries at one end a sprocket 31 over which, and the sprocket 5, a driving chain 32 passes. Keyed at 36 to the shaft 30 are two pulley parts 34 and 35, these parts being provided with thrust bearings 37, the part 35 being slidable along the shaft toward and from the part 34.

A threaded bushing 41 is secured to the frame of the unit 22 and cooperates with the threaded end 40 of a bushing 38 on shaft 30. The head 38 of the sleeve is provided with gear teeth 39 of substantial length to mesh with gear 21, hereinbefore mentioned. The head 38 abuts the adjacent bearing 37 (see Fig. 4).

A link belt 42 passes over pulley parts 24, 25 and 34, 35.

Secured to the framework of unit 22 are two slotted bars 43 having a pin 44, vertically bodily movable up and down in the slots of the bars 43 and carrying an idler 45, under which link belt 42 passes, and is held taut by a weight 47 suspended from a sling 46.

The unit 22 is supported by a bracket 48 secured to the end frame 1.

The in-put shaft 23 has a gear 51 that meshes with a gear 50 on the cam shaft 49.

Operation

With a full beam in place, pulley members 34 and 35 will be closest together, and roller 10 will assume the position shown in dot and dash lines in Fig. 1. As cam shaft 49 turns at a uniform uninterrupted speed, its power will drive shaft 23 and, through link-belt 42, will drive shaft 30. Shaft 30, via chain 32, drives speed reducer 4 which, in turn, operates the beam, turning the same continuously. As thread T is delivered from the beam, the diameter of the beam progressively decreases and roller 20 moves inwardly approximately along a radius of the beam.

The inward movement of roller 10 allows spring 11 to turn shaft 8 and, through the gear train 12, 14, 15, 16, 18, 19, shaft 20 is turned proportionately. This causes gear 21 to turn sleeve 40 in a direction from left to right in Fig. 2. By the time the beam is empty, pulley parts 34 and 35 will be fully separated due to the recession of sleeve 40 (see full lines, Figs. 2, 3 and 4). Thus it will be seen that as the diameter of the beam reduces, the speed of shaft 30 is increased in such proportion that the linear speed of the thread T from the beam is always the same for a particular adjustment of pulley 25 with respect to pully 24.

If a faster or slower thread speed is desired, it is only necessary to change the space between pulley parts 24 and 25 accordingly. The position of the parts shown in the drawings is for the fastest thread speed.

The weight 47 is adjustable so that only enough weight is carried as is necessary to keep the link-belt 42 properly taut.

From the foregoing description, taken in connection with the accompanying drawings, it is thought that the construction, operation, and advantages of my invention will be clear to those skilled in the art.

What I claim is:

1. In a mechanism of the class described wherein thread is removed from a beam for delivery to the needles of a knitting machine, the improvement which includes a positive acting, infinitely variable speed unit, said unit including an in-put shaft, an out-put shaft, two complementary pulley elements on said in-put shaft, means keying said pulley elements to said in-put shaft, means locking one of said pulley elements to said in-put shaft and means adjustably holding the other of said pulley elements on said in-put shaft, two complementary pulley elements keyed to said out-put shaft, one of which elements is slidable along said out-put shaft toward and from the other, a driving belt operatively engaging said pulley elements, a floating weighted idler beneath which said belt passes to tension said belt and continuously tend to effect separation of said pulley elements on said out-put shaft, said unit also including a direct acting screw device for pushing said slidable pulley element toward its complementary pulley element; power transmitting connection between said out-put shaft and the beam for turning the beam to let off thread; a rock shaft with arms, a beam engaging roller carried by said arms, means holding said roller in contact with said beams; and means including a gear train operatively connecting said rock shaft with said screw device for operating the same for purposes described.

2. In a beam thread let-off mechanism wherein the beam is carried by a shaft which continuously rotates and wherein means are provided for letting off the thread at a predetermined linear speed, the improvement which includes, as a part of the beam-operating mechanism, an infinitely variable speed unit comprising a support, an in-put shaft and an out-put shaft mounted in bearings in said support, two relatively fixedly positioned complementary pulley elements on said in-put shaft, two complementary pulley elements on said out-put shaft, said pulley elements being keyed to their respective shafts, one of the pulley elements on the out-put shaft being movable toward and from the other, a threaded bushing on said support, a threaded sleeve operatively engaging said bushing and said movable pulley element, vertical guides secured to said support, an idler pulley with a shaft mounted in and movable bodily along said guides, a belt operatively engaging all said pulley elements and said idler pulley, means including said idler pulley for causing said belt continuously to urge said movable pulley element in opposition to the action of said sleeve, and means to turn said sleeve to progressively increase the speed of said out-put shaft, said last named means including a gear on said sleeve, a rotatable shaft journalled in said support, a gear on said rotatable shaft meshing with said sleeve gear, and means for turning said rotatable shaft, said last named means including a speed reducer connected with the beam shaft, and a sprocket and chain connection between said speed reducer and said output shaft.

GEORGE O. YOUNG.

REFERENCES CITED

The following references are of record in the file of this patent:

UNITED STATES PATENTS

| Number | Name | Date |
| --- | --- | --- |
| 917,684 | Van Nort | Apr. 6, 1909 |
| 2,221,166 | Heinrich et al. | Nov. 12, 1940 |
| 2,303,903 | Bassist | Dec. 1, 1942 |
| 2,383,562 | Plunkett et al. | Aug. 28, 1945 |
| 2,400,526 | Amidon | May 21, 1946 |